United States Patent Office.

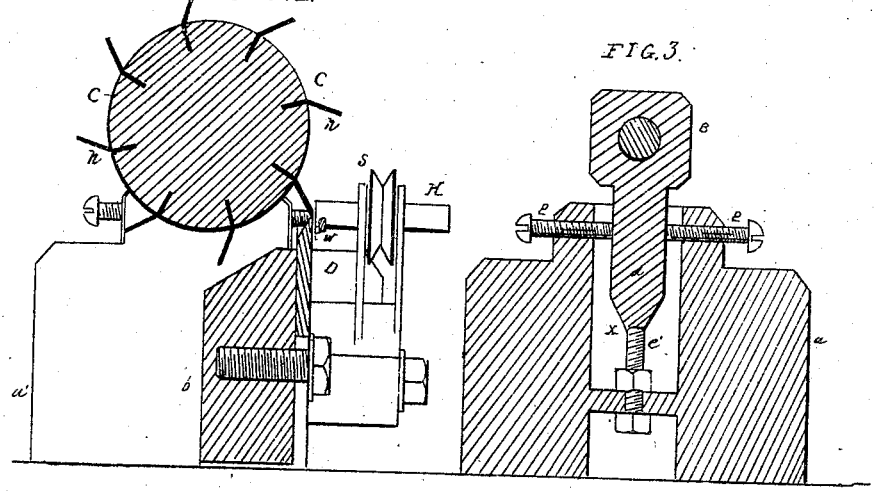

CAROLINE L. LUTTON, OF PHILADELPHIA, PENNSYLVANIA, ADMINISTRATRIX OF THE ESTATE OF E. T. C. LUTTON, DECEASED.

Letters Patent No. 74,923, dated February 25, 1868.

IMPROVEMENT IN MACHINE FOR SHEARING YARN.

The Schedule referred to in these Letters Patent and making part of the same.

TO ALL WHOM IT MAY CONCERN:

Be it known that EDWARD T. C. LUTTON, deceased, late of Philadelphia, Pennsylvania, did invent an Improved Machine for Shearing Yarn; and I do hereby declare the following to be a full, clear, and exact description of the same.

The invention of the said E. T. C. LUTTON consists of certain mechanism, fully described hereafter, for shearing the protruding threads from yarn, and thereby rendering the same soft and smooth like the yarn known as Berlin zephyr, as described in the patent granted to the said E. T. C. LUTTON, on the 18th day of December, A. D. 1866.

In order to enable others skilled in the art to make and use the invention, I will now proceed to describe its construction and operation, reference being had to the accompanying drawing, which forms a part of this specification, and in which—

Figure 1 is a side elevation of the improved machine for shearing yarn.

Figure 2, a section on the line 1–2, fig. 1.

Figure 3, a section on the line 3–4, fig. 1.

Figures 4 and 5, detached views of part of the machine drawn to an enlarged scale.

Figure 6, a section on the line 5–6, fig. 4; and

Figure 7, a section on the line 7–8, fig. 5.

The frame of the machine consists of end-pieces, $a$ $a'$, and a cross-piece, $b$, and into an opening, $x$, in each end-piece projects the leg $d$ of the journal-box B; set-screws $e$ $e$ $e'$, which bear against the opposite sides and lower end of this leg, maintaining the latter and its box in their proper position vertically and laterally. In the boxes B B turn the journals of a shaft, C, on which are a driving-pulley, $f$, and a collar, $g$, and to the latter are secured a number of sharp-edged and inclined blades, $h$. An adjustable knife, D, is secured to the front of the cross-piece $b$, in such a position that as the shaft C revolves, the cutting-edges of the blades $h$ pass in close proximity to the edge $y$ of the knife, the latter being bevelled from the inside, as seen in figs. 6 and 7.

To one edge of the bar which forms the knife D is secured an adjustable plate or guide, E, one edge of which is curved, as shown in the drawing, and on the straight edge of the guide is a projection, $m$, which has a curved lower edge, $y$, and between which and the face of the knife D is a narrow space, $w$; the upper edge of the projection being parallel to and a short distance below the edge $x'$ of the knife.

In the curved edge of the guide E is a groove or channel, $i$, which is in line with the space $w$, as shown in fig. 5, for a purpose described hereafter.

To the opposite vertical edge of the knife D is secured an adjustable plate, F', a lug, $n$, at the upper end of which overlaps, but is not in contact with the end of the projection $m$.

To the cross-piece $b$, between the knife D and the end-piece $a$, is secured an adjustable rod, F, from one side of which projects a pin, $o$.

In an adjustable arm, G, secured to the cross-piece $b$, turns a short tube, H, to which is secured a grooved pulley, $s$, the inner end of the said tube being directly above the space $w$, as shown in fig. 2.

A driving-belt passing round the pulley $f$, imparts to the shaft C a rotary motion in the direction of its arrow, and a rotary motion in the direction of its arrow is imparted to the tube H by a driving-band passing round the grooved pulley $s$. The yarn to be sheared is passed round the rod F into the curved channel $i$ of the guide E, through the space $w$ below the projection $n$, to and through the tube H, and to a suitable winding-bobbin, the space $w$ being just sufficient in width to allow the yarn (which is temporarily twisted by the action of the revolving tube H) to pass freely between the projection $m$ and the knife D, while the guide E and plate F', with its projection $n$, are so adjusted that the yarn shall be in close proximity to the edge $x'$ of the knife D, as shown in fig. 7.

As the yarn is twisted, the fibres projecting from it will extend above the edge of the knife D, and will be sheared close to the body of the yarn by the joint action of that knife and the revolving blades $h$, this shearing of the yarn rendering it so smooth that it resembles fine Berlin wool, as fully described in the above-mentioned patent of the late E. T. C. LUTTON. This operation will continue until a portion of the thread having a knot in it is brought against the guide E, when, as the space w is too contracted to admit the knot, the latter will pass in contact with the lower edge of the projection m, fig. 4, thus withdrawing the yarn from the cutting-edges of the knives. The cutting of the knot, the consequent severing of the thread, and the interruption of the process of shearing, are thus prevented. After the knot has passed the projection m, the yarn will resume its former position in respect to the cutting-edges of the knives, by which it will be sheared, as before.

As the shaft C, knife D, guide E, plate F', rod F, and tube H, are all adjustable, yarns of various sizes may be uniformly guided, so as to pass in such close proximity to the knives that the fibres may be sheared close to the body of the thread without the latter being cut, while the knives may be readily adjusted during the operation of the machine, so as to obtain the best shearing effect.

Without confining myself to the precise construction and arrangement of parts herein described—

I claim, as the invention of the said E. T. C. LUTTON, and desire to secure by Letters Patent—

1. The combination of the revolving blades h, the knife D, and a plate or projection, m, between which and the knife the yarn is caused to traverse, all substantially as described.

2. The combination of the above with the guiding-plate E and revolving tubular spindle H.

In testimony whereof, I have signed my name to this specification in the presence of two subscribing witnesses.

CAROLINE L. LUTTON.

Witnesses:
JOHN WHITE,
W. J. R. DELANY.